United States Patent [19]

Ogura et al.

[11] Patent Number: 5,408,288
[45] Date of Patent: Apr. 18, 1995

[54] PHOTOGRAPHIC FILM CASSETTE AND LENS-FITTED PHOTOGRAPHIC FILM UNIT USING THE SAME

[75] Inventors: Toshiyuki Ogura; Shigemitsu Mizutani, both of Kanagawa; Kazuo Kamata, Saitama, all of Japan

[73] Assignee: Fuji Photo Film Co., Ltd., Kanagawa, Japan

[21] Appl. No.: 114,093

[22] Filed: Aug. 31, 1993

[30] Foreign Application Priority Data

Aug. 31, 1992 [JP] Japan .................................. 4-232440

[51] Int. Cl.⁶ .............................................. G03B 17/26
[52] U.S. Cl. ...................................................... 354/275
[58] Field of Search ........ 354/173.1, 173.11, 212–216, 354/170–172, 275; 242/71.1

[56] References Cited

U.S. PATENT DOCUMENTS 1,967,061 7/1934 Muros ................................. 354/212
5,247,325 9/1993 Takahashi ........................... 354/275

FOREIGN PATENT DOCUMENTS 63-271326 11/1988 Japan .

*Primary Examiner*—David M. Gray
*Attorney, Agent, or Firm*—Young & Thompson

[57] ABSTRACT

A lens-fitted photographic film unit has a film supply chamber preloaded with unexposed photographic film. A cassette-containing chamber contains a film cassette. The film after exposure is wound on a spool of the cassette. The film unit is provided with a mechanism for exposing the film in a succession of frames. An axial hole is formed in an upper end of the spool. Knurled inner teeth are formed inside the axial hole. A wind-up wheel is mounted on the film unit over the cassette-containing chamber to be externally operable for rotation. A drive shaft on the wind-up wheel protrudes into the cassette-containing chamber, and is received in the axial hole. Knurled outer teeth about the drive shaft mesh with the inner teeth on the spool. The drive shaft and spool will thus mesh with each other in any relatively rotated position thereof, which avoids loss of usable film.

8 Claims, 7 Drawing Sheets

PHOTOGRAPHIC FILM CASSETTE AND LENS-FITTED PHOTOGRAPHIC FILM UNIT USING THE SAME

BACKGROUND OF THE INVENTION

1. Field of the Invention

The present invention relates to a photographic film cassette, and to a lens-fitted photographic film unit using the same. More particularly, the present invention relates to a photographic film cassette which is improved as to its use with a lens-fitted photographic film unit, and to the lens-fitted photographic film unit using the same.

2. Description of the Prior Art

Lens-fitted photographic film units (hereinafter referred to simply as film units) are now on the market, e.g. under the trademark "Fujicolor Quick Snap" (manufactured by Fuji Photo Film Co., Ltd.). Such known film units are a single-use camera preloaded with photographic film strip (hereinafter referred to as film). The film unit has a main body provided with a film supply chamber and a cassette-containing chamber formed on opposite horizontal sides of a taking lens. The unexposed film is wound in a roll in the film supply chamber. An externally rotatable wind-up wheel is coupled with a spool in the cassette contained in the cassette-containing chamber. A user who has purchased the film unit winds the film frame by frame back into the cassette after each exposure. The film unit in its entirety is then forwarded to a photo laboratory after exposure of the film. An operator at the laboratory unloads the film, and subjects it to development and printing. The user receives finished photographs and a negative film but does not receive the film housing of the film unit.

A 135-type photographic film as defined by the International Organization for Standardization (ISO) has a standard number of photographable frames and a length sufficient for such imaging these frames. The prevailing standard provides an allowance of film beyond the length sufficient for the nominal number of exposures, to such an extent that a conventional camera can take with standard film one or two exposures in addition to the standard number of exposures ascribed to the film. To make greatest use of such allowance in the available length of the film, improved film units are now on the market, e.g. under the trademark "Fujicolor Quick Snap Econoshot" (manufactured by Fuji Photo Film Co., Ltd.), with which a user can take a greater number of photographs than the stated number of photographable frames of the strip of film contained therein, e.g. 27 photographs on a 24-exposure film.

To take good photographs greater in number than the stated number of exposures on the film, it is necessary to position the film initially relative to the exposure aperture of the film unit, so as to keep unchanged the interval between the first frame on the film and the film end attached to the spool in the cassette. This is because, should the interval between the first frame and the film end be too long, it may happen that a predetermined greater number of photographs, e.g. 27, cannot all be taken.

To insert the film cassette into the cassette-containing chamber, it is necessary to engage the spool of the cassette with a drive shaft formed on the wind-up wheel of the film unit. The conventional spool is provided with a key structure formed at an upper end of the spool and shaped in rotational symmetry about 180 degrees or half a rotation. The conventional drive shaft on the wind-up wheel is provided with a fork structure shaped in rotational symmetry about 180 degrees. It may happen that either of the spool and the drive shaft must be rotated relatively through as much as 180 degrees before the spool can be engaged with the drive shaft.

When the film is inserted and positioned in the exposure aperture, the shutter mechanism is set to have a predetermined orientation. This is because even operations in factory associated with assembly, e.g. testing of the shutter mechanism, never consume any extra portion of the film.

When the film is wound up back into the cassette, it rotates a driven sprocket wheel which engages perforations in the film, and this causes a wind-up stop mechanism to prevent the wind-up wheel from rotating further than is necessary to rewind the film by one frame. When the shutter mechanism is kept oriented in consideration of positioning of the film, correspondingly the sprocket wheel is kept positioned rotationally. In further correspondence with this, the wind-up stop mechanism, and the wind-up wheel are kept positioned rotationally. Because of the key structure of the spool, it is impossible when positioning the film to adjust the rotational position of the wind-up wheel as preferred. Accordingly the direction of the key structure of the spool requires adjustment in view of the rotational position of the wind-up wheel.

Prior to inserting the film into the film housing in the course of manufacturing the film unit, nearly all the strip of the film is drawn out of the cassette. Drawing out of the film is terminated before tension along the film increases excessively between the roll and the cassette. This is because, should the tension become excessive while the film is fully drawn out of the cassette, this tension would pull and stretch the film, or curl the film in the direction along the film width, thereby to cause difficulties in positioning the film inside the film unit.

However, reduced tension of the film in the course of insertion frequently causes some deviation in the rotational positions of the spools in the mass production of the film units. As it may happen that the conventional spool must be rotated at 180 degrees relative to the drive shaft before the spool can be engaged with the drive shaft, it frequently happens that a rotational position of the spool is such that the key structure of the spool cannot be engaged with the fork of the wind-up wheel. If the spool is rotated through an angle up to 180 degrees for adjustment according to the fork, the precision of positioning of the film initially relative to the exposure aperture is reduced. The interval between the first frame and the film end will vary. As a result, a predetermined number of photographs, greater than the stated number of exposures on the film, cannot be taken completely.

OBJECT OF THE INVENTION

In view of the foregoing problems, an object of the present invention is to provide a photographic film cassette having a spool such that, when associated photographic film is initially positioned inside a lens-fitted photographic film unit, precision in positioning is ensured.

It is also an object of the invention to provide a lens-fitted photographic film unit for use therewith.

SUMMARY OF THE INVENTION

In order to achieve the above and other objects and advantages of this invention, an axial hole is formed in a distal end of a spool in a photographic film cassette, which is specially adapted to receive a rotary drive shaft when a camera is loaded with the film cassette. Knurled inner teeth are formed on the inside of the axial hole in the end of the spool that receives the drive shaft, thereby to rotate the spool upon rotation of the drive shaft.

A wind-up wheel is mounted over the cassette-containing chamber of the camera, to be rotated by the user. The drive shaft is formed on the wind-up wheel to protrude into the cassette-containing chamber and to be inserted in the axial hole in the cassette spool. Knurled outer teeth are formed around the drive shaft to mesh with the inner teeth of the axial hole.

The interval between the first frame and the film end is thus prevented from varying. A predetermined number of photographs, greater than the stated number of exposures on the film, can thus be taken without fail.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
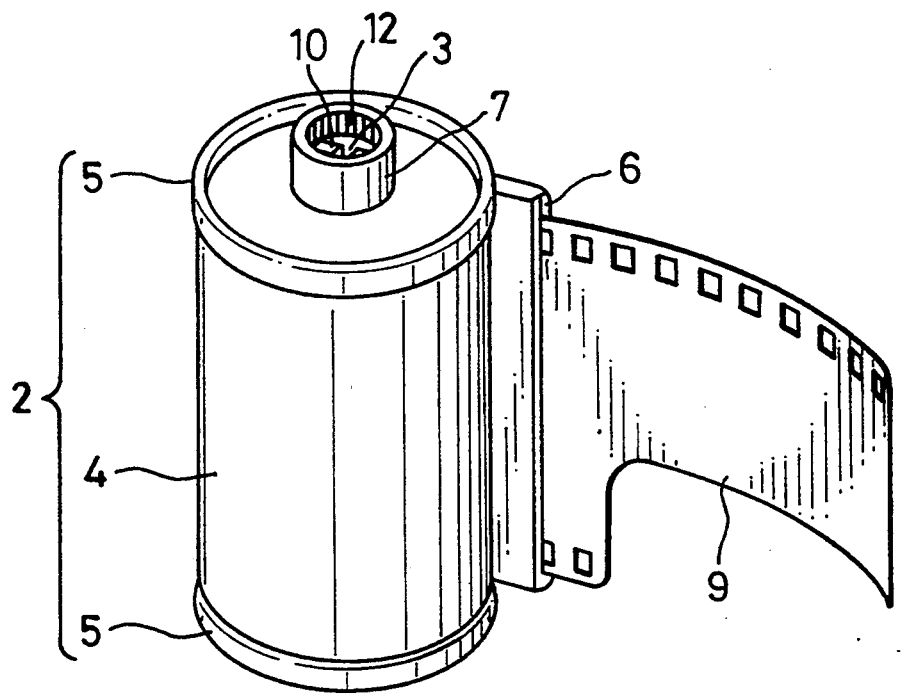
FIG. 1 is a perspective view illustrating a novel photographic film cassette according to the present invention.
Figure 2:
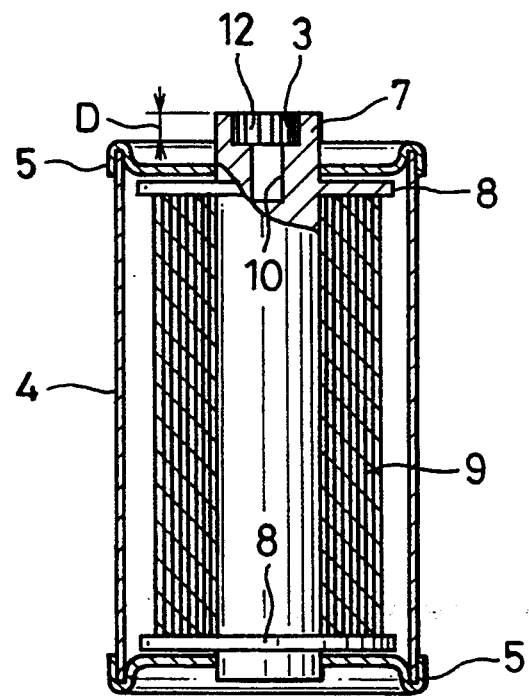
FIG. 2 is a vertical section through the film cassette of FIG. 1.
Figure 3:
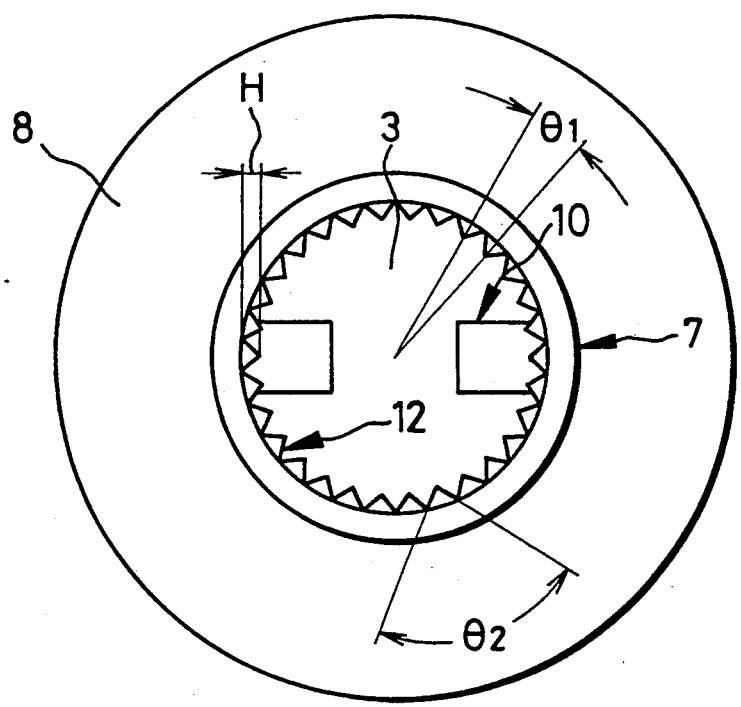
FIG. 3 is an enlarged plan view of the spool of the novel cassette of the present invention.

In FIG. 1 illustrating a photographic film cassette having a novel spool, a cassette shell 2 formed of thin metal plate is constituted of a body plate 4 rolled cylindrically, caps 5 fitted on both ends thereof, and light-shielding member or plush attached to a passage port 6 for photographic film. As is illustrated in FIG. 2 in detail, a spool 7 is rotatably contained in the cassette shell 2. Photographic film 9 is wound on the spool 7 between a pair of spool flanges 8.

Figure 8:
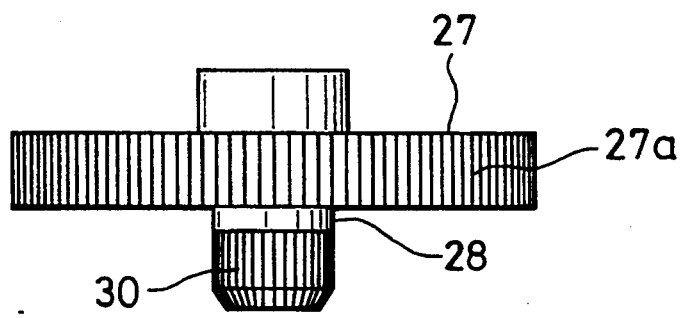
FIG. 8 is an elevational view of a wind-up wheel of the lens-fitted photographic film unit.
Figure 9:
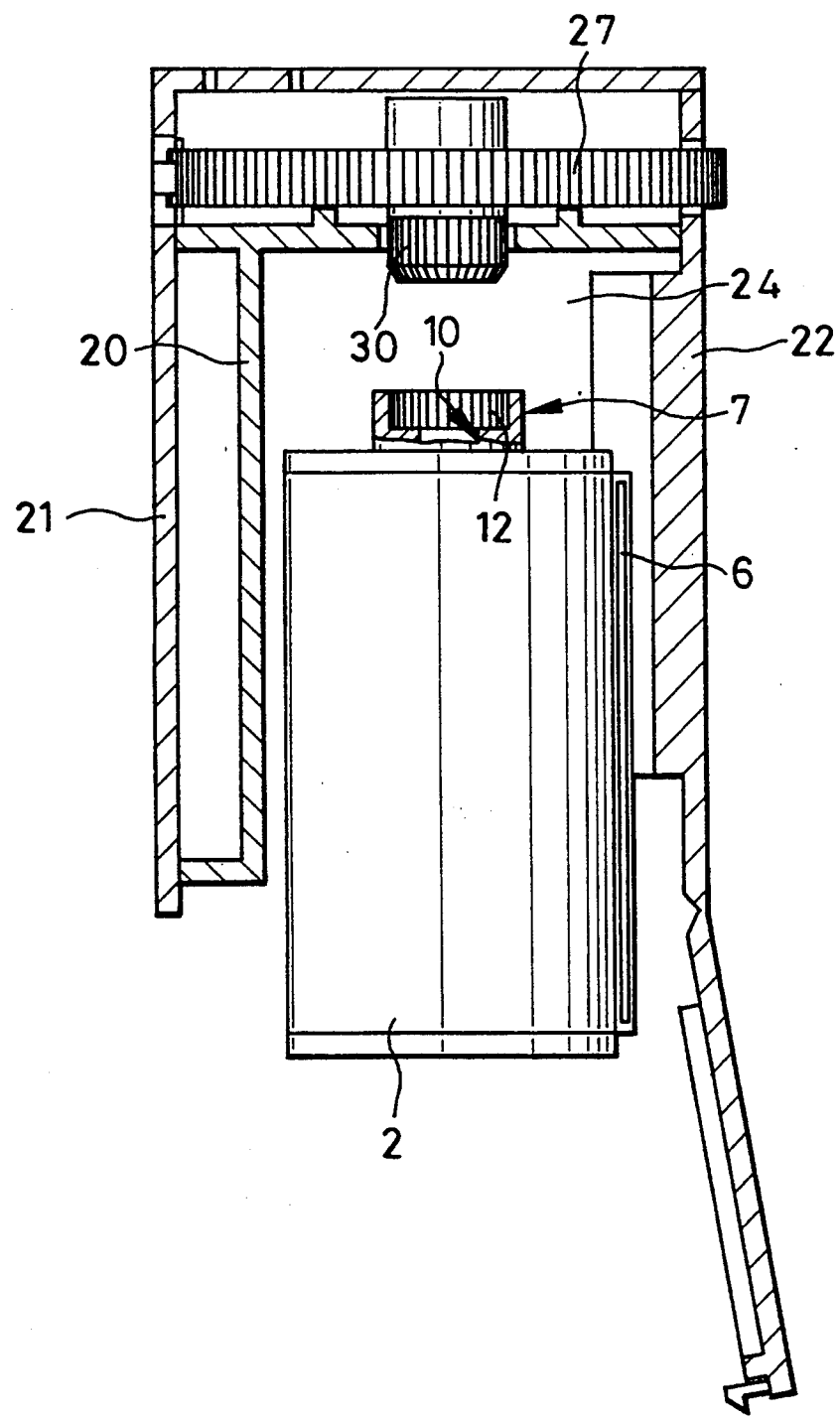
FIG. 9 is a cross section of the lens-fitted photographic film unit during assembly.

One distal end of the spool 7 is provided with an axial hole 3 which receives a drive shaft, as shown for example in FIGS. 8 and 9, incorporated in a camera or a lens-fitted film unit, for winding up the film 9. A pair of diametrically opposed engageable keys 10 are formed in the bottom of the axial hole 3. The keys 10 have tops whose level is D deep from the distal end of the spool 7. D is preferably 3.5 mm in the present embodiment, but can be from 2 to 4.2 mm. The keys 10 are symmetrical so they have the same orientation upon each half rotation of the spool 7.

The keys 10 are accessible to a fork-shaped drive shaft 41 (see FIG. 10) having a fork 40 formed in a rotationally symmetrical shape with respect to half a revolution. When the drive shaft 41 rotates, rotation is transmitted via the engaged keys 10 to the spool 7 to rotate it. In a spool end opposite to the axial hole 3, there is formed an axial hole (not shown) and engageable keys, in the manner of a conventional standardized spool.

On the inside of the axial hole 3, there is formed an inner gear with a depth D. The inner gear is constituted of a plurality, for example thirty, of inner teeth 12 of roulette or knurled arrangement, which are arranged at a predetermined pitch, namely at the angular pitch $\theta1$ being equal to 12 degrees. The tip angle $\theta2$ of the inner teeth 12 is 90 degrees. The height of the teeth 12 is 0.55 mm. The interval W between adjacent tips of the inner teeth 12 is 0.96 mm. Those values are changeable with the circumstances. It is preferable that $\theta2$ is in the range from 60 to 100 degrees.

Figure 4:
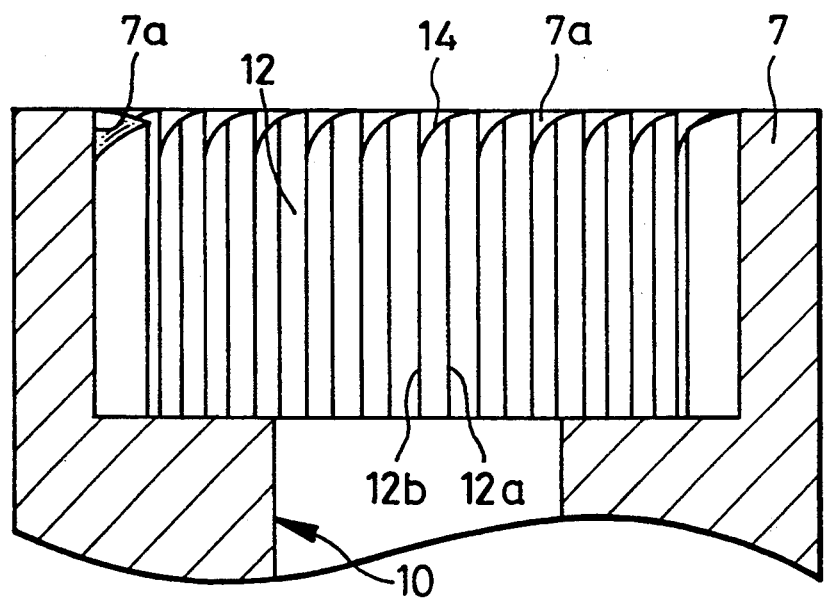
FIG. 4 is a fragmentary vertical section illustrating the axial hole of the spool.

In FIG. 4, reference numerals 12a and 12b respectively represent tips of the inner teeth 12 and bottoms between the inner teeth 12. A distal end of the inner teeth 12 is provided with sloping faces 14 spaced apart by cylindrical faces 7a inside the spool 7. When a drive shaft 28 (see FIG. 8) is inserted in the axial hole 3, the sloping faces 14 guide the drive shaft 28. The sloping faces 14, as is illustrated in FIG. 4, are curved in arcuate fashion at a radius of curvature of about 0.75 mm, and slope on an arc lying on a circle whose axis extends radially of the spool 7. Such a slope is also useful for preventing wind-up wheel 27 from rotating in the clockwise direction X as viewed in FIG. 7, namely in the reverse direction to that for winding up the film, when the drive shaft 28 formed integrally with the wind-up wheel 27 is pressed into the axial hole 3.

The wind-up wheel 27 is provided with peripheral teeth 27a of roulette or knurled arrangement. A main body 20 of the film unit is provided with a preventive claw 20a (FIG. 7) for contact with the peripheral teeth 27a in order to prevent the wind-up wheel 27 from rotating reversely, namely, in the clockwise direction. Should the spool 7 lack the sloped faces 14, the drive shaft 28 could be pressed into the axial hole 3 so as to apply reverse rotational force to the wind-up wheel 27 for slight rotation. The reverse rotational force applied to the wind-up wheel 27 would press the peripheral teeth 27a against the preventive claw 20a, which would hinder the axial hole 3 from receiving the drive shaft 28. Even if the axial hole 3 should fully receive the drive shaft 28, a manufacturing step of ultrasonic welding following the cassette-loading step would weld the preventive claw 20a to wind-up wheel 27 while there is pressure of the peripheral teeth 12 on the preventive claw 20a. But this problem is solved by the construction having the sloped faces 14.

Figure 5:
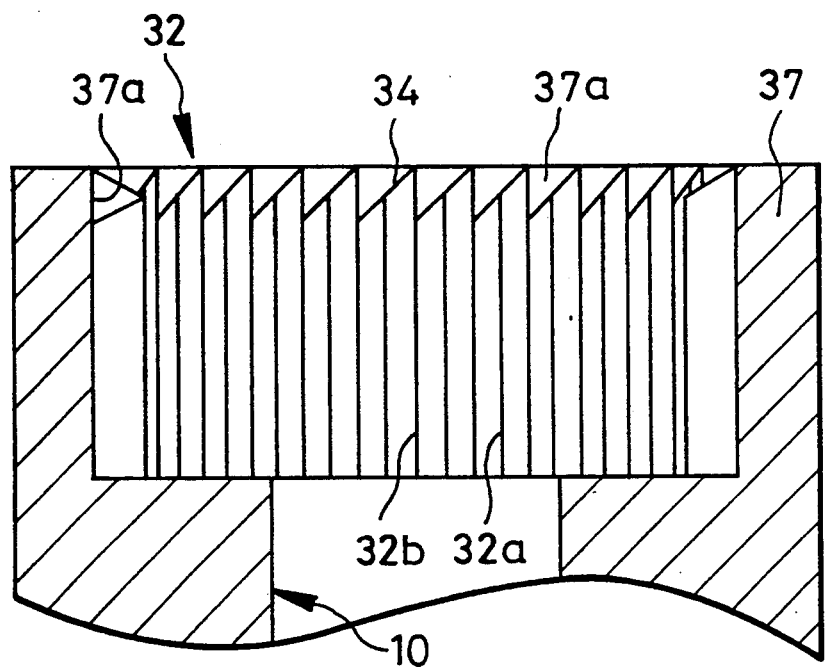
FIG. 5A is a view similar to FIG. 4, of another preferred embodiment of the spool.
FIG. 5B is a fragmentary perspective view illustrating the axial hole of the embodiment of FIG. 5A.
Figure 5:
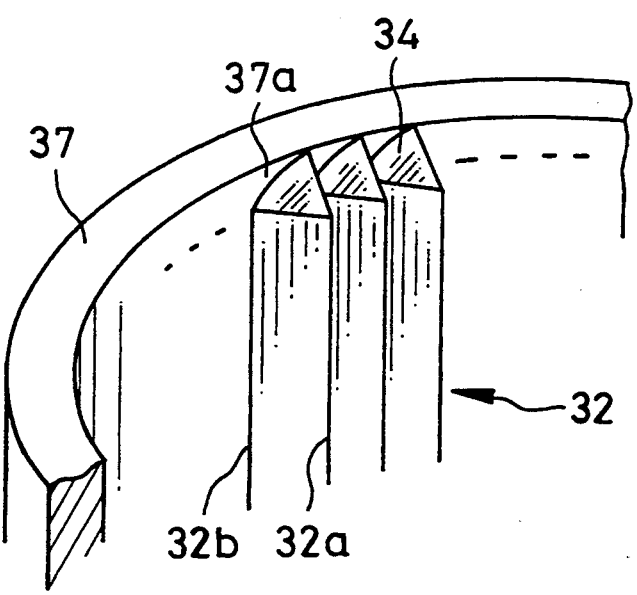
Figure 6:
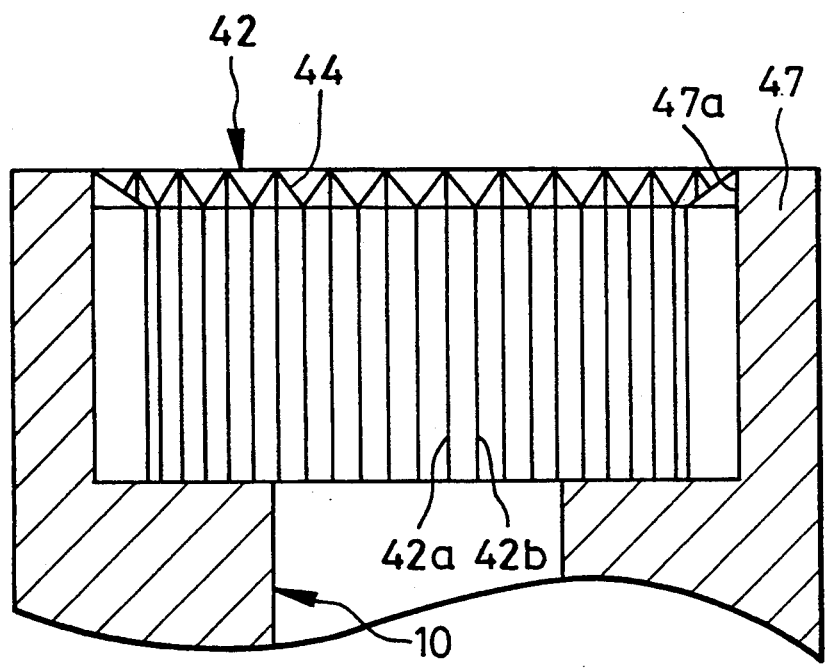
FIG. 6 is a view similar to FIGS. 4 and 5A, of still another preferred embodiment of the spool.

FIGS. 5 and 6 illustrate other preferred sloped faces 34 and 44, respectively. The planar sloped faces 34 in FIG. 5 are radially inwardly directed relative to the axis of spool 37. The planar sloped faces 44 in FIG. 6 are triangular. Shown at 32 and 42 are inner teeth, on which 32a and 42a are tooth tips, and 32b and 42b are tooth bottoms. 37a and 47a are cylindrical faces inside the spools 37 and 47. Those planar sloped faces 34 and 44 are advantageous as well as a tooth-tip angle θ2 of 90 degrees, because it is then easy to prepare molds for forming the spools 37 and 47.

Figure 7:
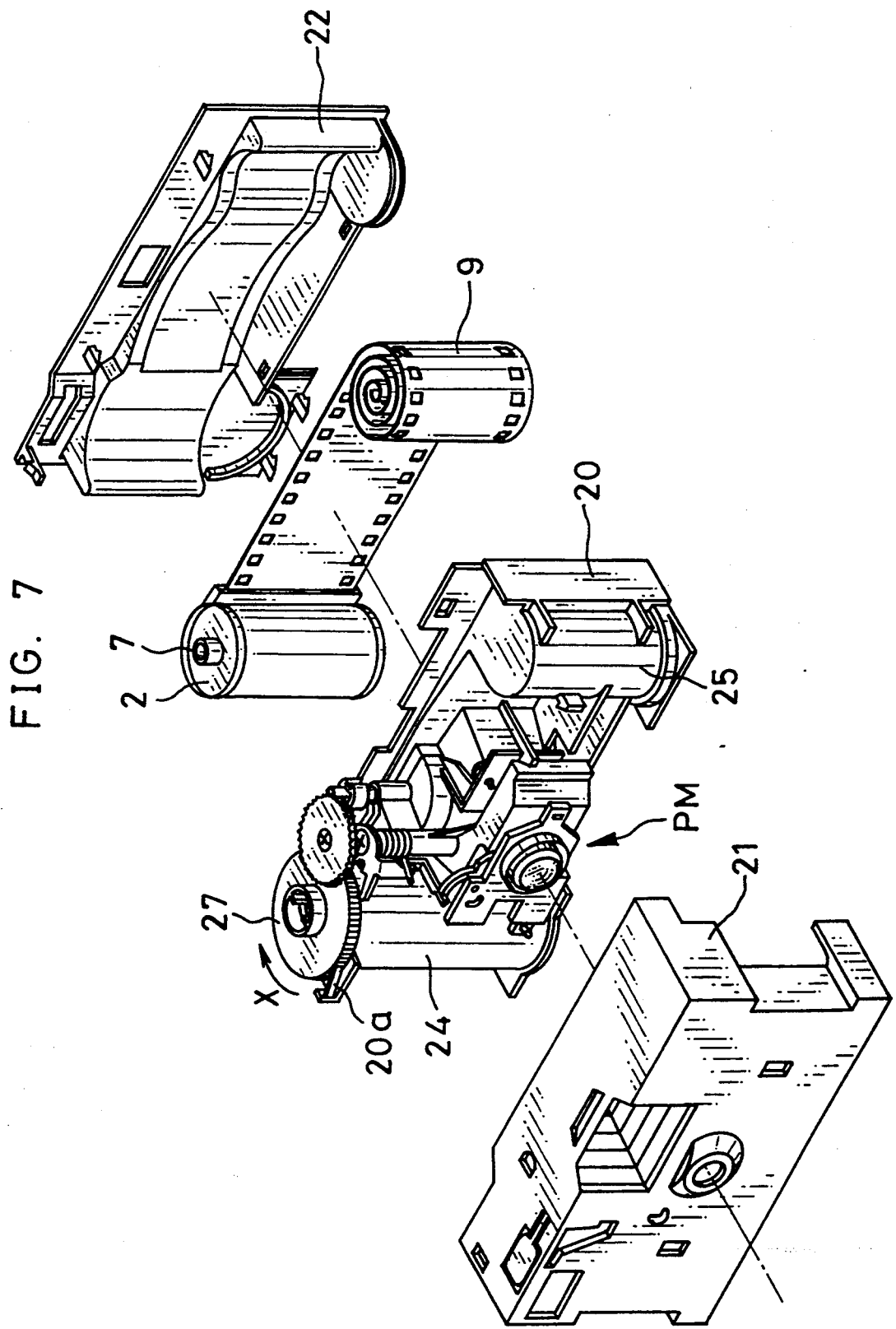
FIG. 7 is an exploded perspective view illustrating a lens-fitted photographic film unit that uses the novel film cassette of the present invention.

FIG. 7 illustrates the relationship between the parts of the lens-fitted film unit to be assembled together. A film housing of the film unit is constituted of the main body 20, a front cover 21 and a rear cover 22, each molded from plastics. The main body 20 is provided with a cassette-containing chamber 24 and a film supply chamber 25. The film cassette 2 is contained in the cassette-containing chamber 24. The unexposed film 9 drawn out of the cassette 2 in a roll is inserted into the film supply chamber 25 through the bottom of the main body in the axial direction.

The main body 20, as is well known in the art, is provided with a photograph-taking mechanism PM comprising a shutter and other conventional parts to effect photography by exposing the film. On the main body 20, the wind-up wheel 27 is mounted rotatably. As is illustrated in FIG. 8, the drive shaft 28 on the bottom of the wind-up wheel 27 is inserted through the top wall of the cassette-containing chamber 24 and projects into the cassette-containing chamber 24. The drive shaft 28 is provided with outer teeth 30 of rouletted or knurled arrangement. When the film cassette 2 is inserted into the cassette-containing chamber 24, the drive shaft 28 is inserted into the axial hole 3 to engage the outer teeth 30 on shaft 28 with the inner teeth 12 in spool 7. The outer teeth 30 are formed to have an angular pitch of 12 degrees, a tip angle of 79.79 degrees, and a tooth height of 0.58 mm. The bottom end of the drive shaft 28 is provided with a conical surface slanted at about 30 degrees, so as to facilitate insertion of the drive shaft 28 into the axial hole 3.

The operation of the above construction will now be described. In the course of manufacturing the lens-fitted film unit, the film housing is assembled together. To load the main body 20 with the film cassette 2 within the cassette-containing chamber 24 as illustrated in FIG. 9, the film 9 is drawn out of the film cassette 2 by the maximum withdrawable amount. The film 9 formed in a roll is inserted into the film supply chamber 25. Note that the film 9 is omitted from FIG. 9 for clarity of illustration. The assembling operation takes care to avoid applying too much tension to the film 9 when the film is fully withdrawn. Were it not for the teeth 12 and 30, the rotational position of the spool 7, when the cassette-containing chamber 24 is loaded with the cassette 2, would not be constant.

In the novel spool 7, the inner teeth 12 in the axial hole 3 cooperate with the outer teeth 30 formed on the drive shaft 28. The coupling of the spool 7 to the wind-up wheel 27 is effected irrespective of the position of the engageable keys 10 and dependent only on the engagement of the outer teeth 30 with the inner teeth 12. At the beginning of insertion of the drive shaft 28 into the axial hole 3, the outer teeth 30 can momentarily fail to engage with, but rather can abut on, the inner teeth 12. If this happens, the spool 7 can be rotated to a small extent in order to couple the drive shaft 28 engagedly with the axial hole 3, i.e. by one angular pitch or half the angular pitch of the inner teeth 12, namely 6 or 12 degrees. Such small rotation of the spool 7 rewinds the film 9 only to the extent of about 0.5 mm, which is small enough to have no influence to the position of the first frame to be exposed in the film unit. It is therefore possible for the film supply chamber 25 to contain the greatest possible amount of film 7. To be precise, the film 7 of a length for 24 exposures in a conventional use can be contained in the novel film unit in a form capable of providing 27 exposures, while being positioned with exactitude, thanks to the interengaging teeth 12 and 30.

Such a lens-fitted film unit is manufactured on the assumption that it will be put to only a single use, so that the film housing lacks adaptation to repeated use. But there are some users who use such single-use photographic film units repeatedly, by repeatedly loading unexposed film, as in a conventional camera. In the film unit adapted to make 27 exposures on a 24-exposure film, there is a frame counter for counting 27 frames. Adaptation of the 24-exposure film to use for 27 exposures requires factory-loading of the film unit with film precisely positioned. It is very difficult for users manually to reload the film unit with unexposed film, because manual handling can position with only low precision a film portion to be first exposed inside the film unit. It can cause an erroneous condition wherein the shutter is operated 27 times to use only 24 or 25 frames on the film, with consequent overlapping of two or three exposures.

The above failure is caused by use of a film cassette having a conventional spool. In accordance with the present invention, however, such a failure is prevented. When it is intended to reload film in the film unit having the wind-up wheel 27, a conventional film cassette having a spool without inner teeth is inserted, but its conventional spool will not couple with the drive shaft 28 of the wind-up wheel 27. This lack of engagement operates to warn the user that 27 exposures could not be effected even though the counter is adapted to count 27 frames. This avoids use wherein fewer frames are created on the film than the times of operating the shutter.

Figure 10:
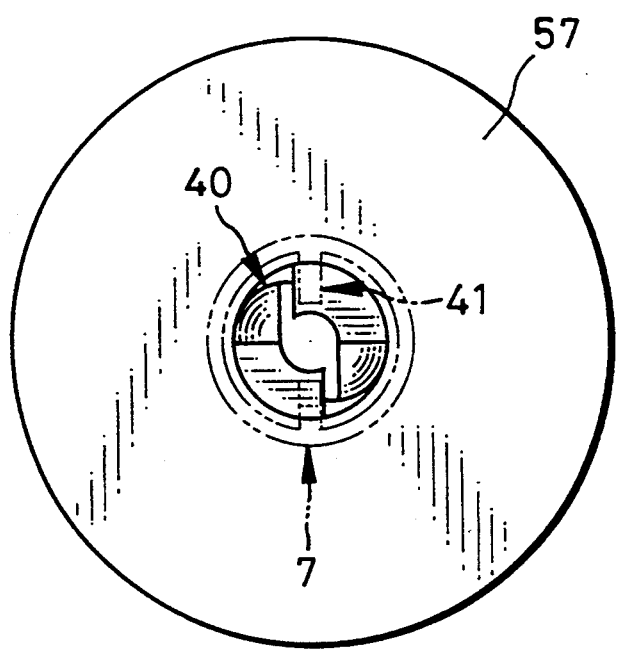
FIG. 10 is a bottom view illustrating another wind-up wheel usable with the novel film cassette.

Notice from FIG. 10 that the novel spool 7 with its inner teeth 12 is usable with a conventional drive shaft 41 which has been in use so far in lens-fitted film units and cameras. The axial hole 3 in the spool 7 and the engageable keys 10 are formed following the definition standardized by ISO. The engageable keys 10 are adapted to engage firmly with the conventional fork 40 on the conventional drive shaft 41. It is easy for users manually to reload a conventional camera or film unit with unexposed film, because a film portion to be first exposed is manually positioned inside the camera, without need for particularly high precision. No fewer imaging frames will ever be created on the film than the times of operating the shutter. The compatibility of the novel spool and drive shaft with the conventional spool and drive shaft is shown in the following table:

|  | Conventional Drive Shaft | Novel Drive Shaft |
| --- | --- | --- |
| Conventional Spool | Usable | Unusable |
| Novel Spool | Usable | Usable |

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A lens-fitted photographic film unit, in which a body contains photographic film drawn out of a cassette in a form of a roll, a film winding wheel is rotated after each exposure to rotate a spool in said cassette, and thereby said film is wound back into said cassette, said film unit comprising:

an axial hole formed in one distal end of said spool;

a pair of engaging plates, projected from said axial hole in a position axially downward inside said axial hole, and shaped in a rotationally symmetrical fashion at a straight angle with respect to an axis of said axial hole; and a key way defined by a plurality of inner teeth formed on an inside of said axial hole and axially upward from said engaging plates;

wherein said winding wheel includes a drive shaft integrally formed therewith and fitted in said axial hole; and said drive shaft includes a plurality of engaging teeth formed thereabout, arranged at a regular pitch, extended axially, and respectively engaged with said inner teeth.

2. A lens-fitted photographic film unit as defined in claim 1, wherein said key way is formed to have a height of about 3.5 mm to said distal end and over said engaging plates.

3. A lens-fitted photographic film unit as defined in claim 1, wherein said inner teeth have tips having an angle from 60 to 100 degrees.

4. A lens-fitted photographic film unit as defined in claim 1, wherein a distal end of said inner teeth has an inclined portion for guiding insertion of said drive shaft into said axial hole.

5. A lens-fitted photographic film unit as defined in claim 4, wherein said inclined portion of said inner teeth is inclined toward said axis from a periphery, and is inclined in a circumferential direction.

6. A lens-fitted photographic film unit as defined in claim 5, wherein said inclined portion is so inclined in said circumferential direction as to cause said winding wheel to rotate in a single direction of winding said film, during contact with said engaging teeth of said drive shaft in inserting said drive shaft into said axial hole.

7. A lens-fitted photographic film unit, in which a body contains photographic film drawn out of a cassette in a form of a roll, a film winding wheel is rotated after each exposure to rotate a spool in said casette, and thereby said film is wound back into said cassette, said film unit comprising:

an axial hole formed in one distal end of said spool;

a pair of engaging plates, formed on an inside defined by said axial hole in said spool, and shaped in a rotationally symmetrical fashion at a straight angle in a position axialy outward inside said axial hole;

a plurality of inner teeth formed inside said axial hole, arranged circularly at a regular pitch, shaped to have a substantially triangular section, and extended axially and upward over said engaging plates;

a drive shaft integrally formed with said winding wheel and fitted in said axial hole while said cassette is contained in said body; and a plurality of outer teeth formed about said drive shaft, shaped to have a substantially triangular section engaged with said inner teeth, and extended axially, said drive shaft fitted in said axial hole to engage said inner teeth with said outer teeth for transmission of rotation of said winding wheel to said spool.

8. A lens-fitted photographic film unit as defined in claim 7, wherein a distal end of said drive shaft has an inclined face where a width decreases, and said outer teeth are extended to said inclined face.

* * * * *